(No Model.)

R. M. HUNTER.
ELECTRIC RAILWAY.

No. 434,030.                    Patented Aug. 12, 1890.

Attest
E. M. Breckinried
E. McDermott.

Inventor
R. M. Hunter

UNITED STATES PATENT OFFICE.

RUDOLPH M. HUNTER, OF PHILADELPHIA, PENNSYLVANIA, ASSIGNOR, BY MESNE ASSIGNMENTS, TO THE THOMSON-HOUSTON ELECTRIC COMPANY, OF BOSTON, MASSACHUSETTS.

ELECTRIC RAILWAY.

SPECIFICATION forming part of Letters Patent No. 434,030, dated August 12, 1890.

Application filed October 4, 1886. Serial No. 215,200. (No model.)

*To all whom it may concern:*

Be it known that I, RUDOLPH M. HUNTER, of the city and county of Philadelphia, and State of Pennsylvania, have invented a new and useful Improvement in Electric Railways, of which the following is a specification.

My invention has reference to electric railways; and it consists in certain improvements set out in the following specification, and illustrated in the accompanying drawings, which form part thereof.

Figure 1:
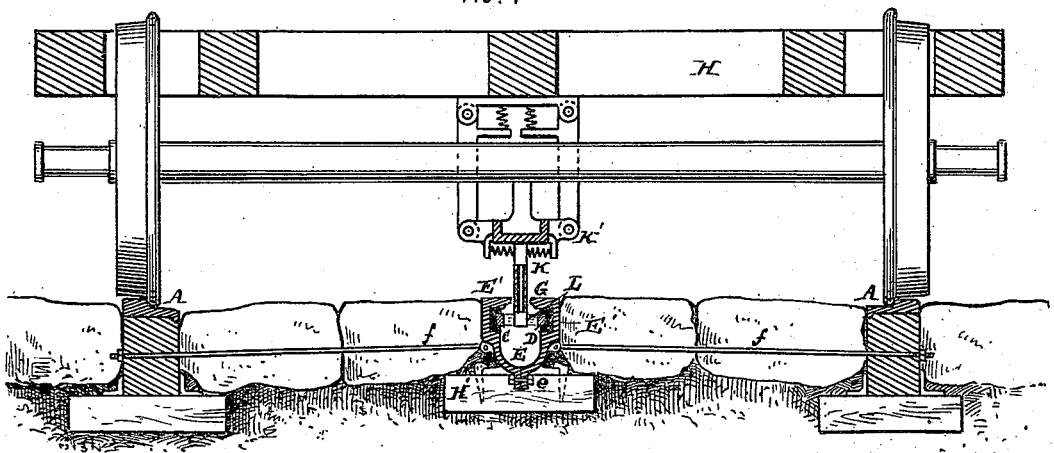
Figure 2:
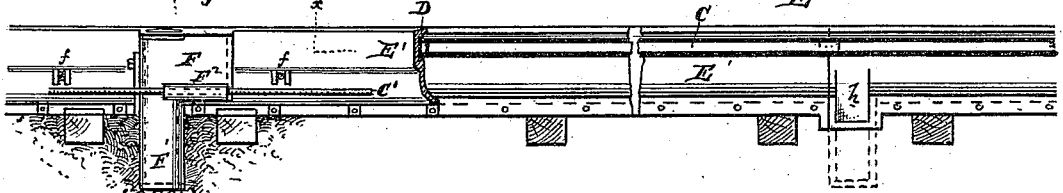
Figure 3:
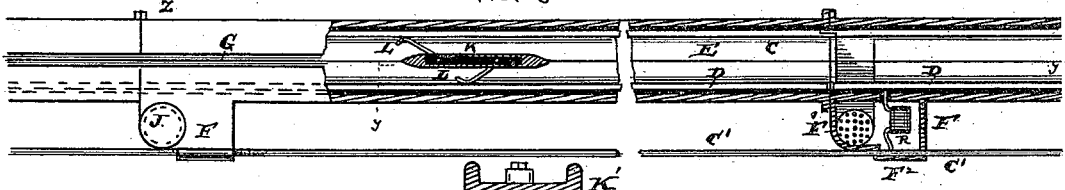
Figure 4:
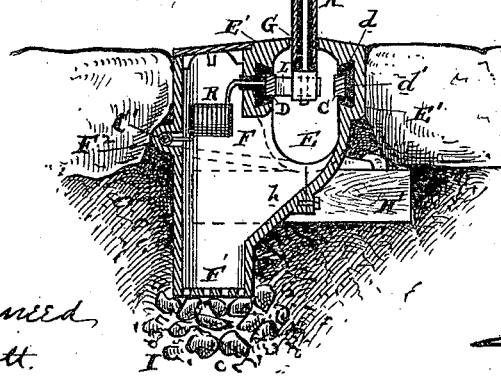

In the drawings, Figure 1 is a cross-section of an electric railway and vehicle embodying my invention. Fig. 2 is a side elevation of my improved conduit for the conductors with a portion broken away on line $y\,y$. Fig. 3 is a plan view of same with a part broken away on line $x\,x$, and Fig. 4 is a cross-section of same on line $z\,z$.

A are the rails. The electric conductors, which supply the current to the collectors on the vehicle, are inclosed within a slotted conduit arranged parallel with the rails. One of these conductors may convey the positive current and the other the negative current to the collectors, and, if desired, the electric current may be supplied to these conductors from separate or supply conductors. The supply-conductors may be connected with the working or conduit conductors, or either of them, by resistances or branch conductors, and such working-conductors so connected may be divided into sections and each section connected independently with the supply conductor or conductors. This is shown in Figs. 3 and 4, but more particularly in my application, Serial No. 246,111, filed August 4, 1887.

In the system shown the rails are not used as the working-conductors, but separate distinct working-conductors are used, and of these C is the continuous return, while D is the sectional working-conductor, the sections of which are connected to the main or supply conductor C' by resistances R. This is the preferred construction, as the conductors C and D may be arranged within a small conduit located between the rails, while the supply or main conductor may be supported on poles or insulated and embedded in the earth. This construction is more clearly shown in Fig. 3 of the drawings.

The rails A shown are those of the ordinary street-car railway and are supported on stringers of wood.

E is the central conduit, formed of two sections E', bolted together at $e$, and forming the slot G at the top. The top portion of the conduit has its edges which form the slot slightly raised to prevent the tendency of water to run into the slot. This conduit is supported on the cross-blocks H' and is tied to the rail-stringers by tie-rods $f$, by which it is insured a central location and avoidance to displacement.

The conductors C and D are shown as arranged within the conduit in the manner specified. These conductors are preferably supported so as to project slightly from the walls of the conduit, and so as to expose a portion of said conduit-walls above and below the conductors, which latter are of much less width than the depth of the conduit-walls. As the conduit-walls would extend above and below the conductor, provision is thus made for clearance-space for insulation and movement of the collector. At specified intervals the conduit has boxes F, connecting with the bottom of the conduit by inclined walls $h$, and having wells F' furnished with grated bottoms. The water, dirt, &c., from the conduit are discharged into the wells. The side walls of the conduit are preferably continuous and the openings to the wells made below them. Here the solid matters collect while the water or liquid runs off through the grating and broken-stone foundation I. The dirt so collected may be removed through hand-holes J, which open into the street. One part of the box F may be made with the curved or tubular part $F^2$, through which the supply-conductor C' passes, it being well insulated and, if desired, inclosed in a leaden pipe. These lead-covered insulated conductors are a well-known article of merchandise. From the interior of the box F the conductor is tapped and connected with one of the sections of the working-conductor through the resistance R, which may be made in any manner desired. It is to be understood that this form of conduit is equally applicable to any other of the types of working-conductors when they do not wholly form the rails. This is evident, as only one working-conductor might be contained within the conduit and the rails might be the return-conductors. These cleaning boxes or wells may be located as often as desired along the conduit, or may be located only with each section D where a resistance R is to be placed. The side walls of the conduit are made with depressions $d'$, into which insulating material $d$ is placed and in or upon which the conductors are secured.

In practice the conductors C D are made in lengths equal to the length of the conduit-sections, whereby the sections may be completed in the shop and subsequently put together to form a continuous conduit and operative line of working-conductors in the street. By this means the cost of a good job is reduced and the outdoor work is greatly facilitated. By making the conduit-walls separate it is easy to attach the working-conductors in place. I do not limit myself to the particular way of uniting these sections at the bottom to form the completed conduit.

The insulation $d$ may be asphaltum or its equivalent, wood, or any other good insulator.

H is the car-truck.

K is a vertical collector-frame, which carries the brushes or collectors L, which run in contact with the conductors within the conduit, and by which the current is conveyed to the motor on the car. The collector-frame K is carried by the horizontal frame K', hung from the truck by links or otherwise.

I do not limit myself to the specific form of conduit shown, nor the particular construction of cleaning-wells, as these and the arrangement of conductors may be modified without departing from my invention.

Having now described my invention, what I claim as new, and desire to secure by Letters Patent, is—

1. The combination of the rails and their supports with a slotted conduit, ties to hold said conduit at a fixed distance with reference to the rails, and one or more bared electrical conductors contained within said conduit, insulated from it and supported parallel with the slot, whereby said conductor or conductors are guarded from injury and from short-circuiting.

2. The combination of the rails and their supports with a slotted conduit, ties to hold said conduit at a fixed distance with reference to the rails, one or more bared electrical conductors contained within said conduit insulated from it and supported parallel with the slot, whereby said conductor or conductors are guarded from injury and from short-circuiting, and drainage-wells located at intervals apart and to one side of the conduit but opening therefrom, and covers for said drainage or cleaning wells, whereby said conduit may be cleaned without exposing the conductor or conductors.

3. A conduit for an electric railway, formed in longitudinal sections and having its side walls separable from each other and provided on their inner faces with grooves, in combination with sections of electric conductors of lengths equal to that of the conduit-sections and permanently secured to the side walls of said sections by being embedded in a non-conducting medium, whereby the conductor may be finished before the conduit is laid and may be coupled to form one or more continuous conductors after being laid.

4. The conduit for an electric railway, consisting of the sections E' E', bolted or secured together at the bottom and made with the slot G at the top, in combination with the cleaning-wells opening into said conduit, and oblique walls $h$, connecting the bottom of said conduit with the cleaning-wells.

5. In an electric railway, a slotted conduit having its upper face or flanges forming the edges of the slot inclined upward, the highest portions being next to the slot, in combination with a bared working electric conductor within said conduit and insulated therefrom and arranged under the flange of the conduit and to one side of the slot, whereby the water and dirt as far as possible is kept from entering the slot, and when so entering are allowed to fall without striking the conductor and endangering its insulation.

6. The combination of a slotted conduit having one or more cleaning-wells, broken stone or porous foundation for said wells to allow the water to freely run off, and a working-conductor arranged within the conduit.

7. In an electric railway, a slotted conduit having cleaning-wells arranged at intervals apart, and openings to said cleaning-wells arranged to one side of the slot but not opening therein, in combination with a working electric conductor having a bared face and arranged longitudinally within the conduit and between the slot and cleaning-wells and insulated from said conduit, and drainage-passages extending from the conduit proper to the cleaning-wells below the conductor.

8. A conduit for an electric railway, formed of two side walls made separable and unitable at their lower parts and adapted to form the open slot at their upper parts, in combination with working-conductors made in lengths substantially equal to the lengths of the conduit-sections, the said conductors being securely fastened to the side walls and insulated from them, whereby the conduit-sections, with their conductors, may be made in the shop and placed in a working condition in the road without necessity of fitting.

9. In an electric railway, a slotted conduit having a continuous side wall, in combination with cleaning-wells having an opening into the street at one side of the conduit, connecting-passages between the conduit and cleaning-wells below the side wall, and a bared electric working-conductor secured to but insulated from said side wall and protected by the conduit, a traveling vehicle, and a current-collecting device carried by the vehicle and extending into the conduit and making electrical connection with the conductor.

10. In an electric railway, a slotted conduit combined with bared working-conductors arranged upon but insulated from the interior side walls of the said conduit, the conductors being much smaller in width than the height of the side walls, and so located as to expose a portion of the conduit-walls above and below them to provide a clearance-space for insulation and movement of the collector.

11. In an electric railway, a slotted conduit combined with bared working-conductors arranged upon but insulated from the interior side walls of the said conduit and slightly projecting therefrom, the conductors being much smaller in width than the height of the side walls, and so located as to expose a portion of said conduit-wall above and below them to provide a clearance-space for insulation and movement of the collector.

12. In an electric railway, a slotted conduit, in combination with working-conductors arranged near the upper portion thereof and upon and insulated from the interior side walls, whereby the dirt and slush in the bottom or lower part of the conduit are considerably removed.

13. The combination of the rails and their supports with a slotted conduit, ties to hold said conduit at a fixed distance with reference to the rails, one or more bared electrical conductors contained within said conduit insulated from it and supported parallel with the slot, whereby said conductor or conductors are guarded from injury and from short-circuiting, a traveling vehicle adapted to run upon the rails, and current-collecting devices carried by the vehicle and extending into the conduit and making contact with the conductor within the conduit.

14. In an electric railway, the combination of a slotted conduit and an insulated conductor contained therein and exposing a vertical bared face, a traveling vehicle, and an electric-current collector carried by said vehicle and extending into the conduit and provided with a vertical contact-surface to make electrical connection with the conductor.

15. A conduit for an electric railway made of metal and formed with separable side walls, in combination with bared working electric conductors secured to the two longitudinal halves and insulated therefrom and from each other, and a joint or line of union at or near the bottom of the conduit.

16. In an electric railway, the combination of a conduit having an overhanging flange at the top to form a slot, a longitudinal bared working-conductor located therein below the said flange and to one side of a vertical plane through the slot, and drainage-wells of greater depth than the bottom of the conduit and below the conductor.

17. In an electric railway, a slotted conduit, in combination with a bared working-conductor secured within the conduit and insulated therefrom and located near the upper portion thereof, so as to be away from the dirt, slush, &c., in the conduit.

18. In an electric railway, a stationary source of electric supply, a bared electric working-conductor arranged along the roadway, and a protecting covering or shield projecting over said working-conductor and forming no part of the electric circuit.

19. In an electric railway, a stationary source of electric supply, a conduit, two parallel insulated bared working-conductors arranged parallel to the roadway and within and insulated from the conduit, and a continuous open space between said conductors.

20. In an electric railway, a stationary source of electric supply, a conduit, two parallel insulated bared working-conductors arranged parallel to the roadway and within and insulated from the conduit, and a continuous open space between said conductors and of substantially uniform width.

21. In an electric railway, a stationary source of electric supply, a conduit, two parallel insulated bared working-conductors arranged parallel to the roadway and within and insulated from the conduit, a continuous open space between said conductors, and a protecting shield or covering for each of said conductors, said shields projecting toward each other.

22. In an electric railway, a stationary source of electric supply, a conduit, two parallel insulated bared working-conductors arranged parallel to the roadway and within and insulated from the conduit, a continuous open space between said conductors of substantially uniform width, and a protecting shield or covering for each of said conductors, said shields projecting toward each other and forming a continuous slot.

In testimony of which invention I hereunto set my hand.

RUDOLPH M. HUNTER.

Witnesses:
RICHD. S. CHILD, Jr.,
E. M. BRECKINREED.